United States Patent
Sakiyama et al.

(10) Patent No.: US 9,672,974 B2
(45) Date of Patent: Jun. 6, 2017

(54) MAGNETIC COMPONENT AND POWER TRANSFER DEVICE

(71) Applicant: Panasonic Intellectual Property Management Co., Ltd., Osaka (JP)

(72) Inventors: Kazuyuki Sakiyama, Osaka (JP); Eiji Takahashi, Nara (JP); Takehiko Yamakawa, Osaka (JP); Yoshitake Nakagawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/920,788

(22) Filed: Oct. 22, 2015

(65) Prior Publication Data

US 2016/0148751 A1 May 26, 2016

(30) Foreign Application Priority Data

Nov. 20, 2014 (JP) .................. 2014-235126

(51) Int. Cl.
*H01F 27/28* (2006.01)
*H01F 27/30* (2006.01)
*H01F 30/08* (2006.01)
*H02M 1/00* (2006.01)

(52) U.S. Cl.
CPC ..... *H01F 30/08* (2013.01); *H02M 2001/0064* (2013.01)

(58) Field of Classification Search
CPC .......... H01F 30/08; H01F 30/10; H01F 17/02; H01F 27/28; H01F 27/2823; H02M 3/335; H02M 2001/0064

USPC .......... 336/220, 222, 182, 208, 198; 363/16
See application file for complete search history.

(56) References Cited

U.S. PATENT DOCUMENTS

| | | | | |
|---|---|---|---|---|
| 3,812,443 A * | 5/1974 | Schroeder | ............ | H01F 17/045 336/192 |
| 4,635,019 A * | 1/1987 | Akachi | ................... | H01F 27/28 336/180 |
| 6,617,949 B2 * | 9/2003 | Ishizuka | ............ | H01F 27/2823 336/170 |
| 6,859,130 B2 * | 2/2005 | Nakashima | ......... | H01F 27/2804 29/602.1 |
| 7,236,077 B1 * | 6/2007 | Hsu | ....................... | H01F 27/326 336/180 |
| 2008/0117012 A1 * | 5/2008 | Pilniak | ................. | H01F 41/122 336/205 |
| 2008/0239759 A1 | 10/2008 | Nakahori | | |
| 2012/0140525 A1 * | 6/2012 | Cuadra | ................ | H01F 27/324 363/21.04 |

(Continued)

FOREIGN PATENT DOCUMENTS

JP 2008-253113 10/2008

*Primary Examiner* — Mangtin Lian
(74) *Attorney, Agent, or Firm* — McDermott Will & Emery LLP

(57) ABSTRACT

A magnetic component includes a first winding and a second winding which is insulated from the first winding and magnetically couples with the first winding. The first winding forms a first coil unit by being wound. The second winding forms a second coil unit by being wound about the same axis as the first winding. The second winding forming the second coil unit is disposed in areas X and Z. The magnetic component has the first coil unit and the second coil unit at positions that satisfy Equations 1 and 3.

13 Claims, 14 Drawing Sheets

(56) References Cited

U.S. PATENT DOCUMENTS

2013/0015932 A1* 1/2013 Cho .................. H01F 27/2823
336/182

* cited by examiner

DIRECTION OF CURRENT IN FIRST WINDING

DIRECTION OF CURRENT IN SECOND WINDING

PHASE 30°　　　PHASE 60°　　　PHASE 90°

201

MAGNETIC COMPONENT AND POWER TRANSFER DEVICE

BACKGROUND

1. Technical Field

The present disclosure relates to a magnetic component (for example, an isolation transformer) for use in an electricity power supply such as a DC-DC converter.

2. Description of the Related Art

An isolation transformer used in a conventional power circuit is composed of a primary winding, a secondary winding, and a magnetic core. For increasing the efficiency of the power supply, it is required to decrease loss in the transformer itself. At the same time, it is also necessary to dissipate heat which is generated due to loss in the windings and/or the magnetic core.

For instance, a transformer structure for improving the effect of heat dissipation is described in Japanese Patent No. 5034613. In Japanese Patent No. 5034613, the structure is designed to dissipate heat caused by loss in the magnetic core and/or the windings themselves by structuring the windings as planer conductors so that they have increased areas.

SUMMARY

Conventional arts are not able to decrease the diffusion of magnetic fluxes outside a magnetic component.

In one general aspect, the techniques disclosed here feature a magnetic component including: a first winding; and a second winding which is insulated from the first winding and magnetically couples with the first winding, in which the first winding forms a first coil unit by being wound, and the second winding forms a second coil unit by being wound about a same axis as the first winding. The second winding forming the second coil unit is disposed in an area X and an area Z, where the area X is an area, in an axial direction, in which the first coil unit is not disposed, and the area Z is an area, in the axial direction, in which the first coil unit is disposed, and the magnetic component has the first coil unit and the second coil unit at positons that satisfy following Equations 1 and 3.

$$r1min > rX \quad (1)$$

$$r1max < rZ \quad (3)$$

The present disclosure can decrease the diffusion of magnetic uxes outside the magnetic component.

Additional benefits and advantages of the disclosed embodiments will be apparent from the specification and drawings. The benefits and/or advantages may be individually provided by the various embodiments and features of the specification and drawings, and need not all be provided in order to obtain one or more of the same.

DETAILED DESCRIPTION

Embodiments of the present disclosure will be described below with reference to the drawings.

FIRST EMBODIMENT

Figure 1A:
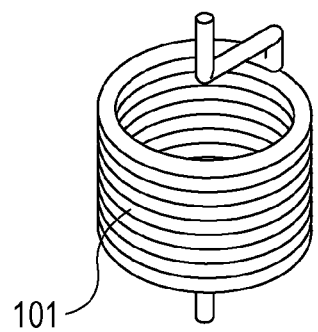
FIGS. 1A and 1B show an exemplary structure of a magnetic component according to a first embodiment of the present disclosure.
Figure 1B:
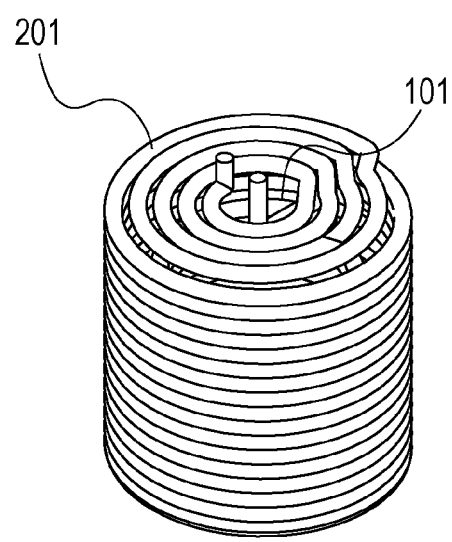
Figure 2A:
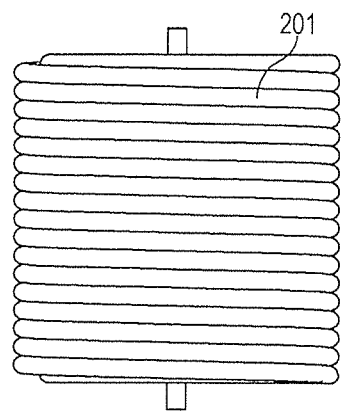
FIGS. 2A to 2E show an exemplary arrangement of a first winding and a second winding in the magnetic component in the first embodiment.
Figure 2B:
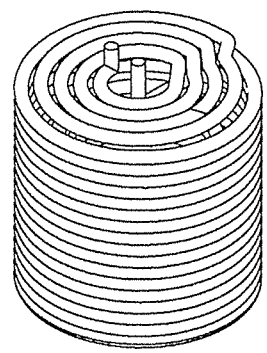
Figure 2C:
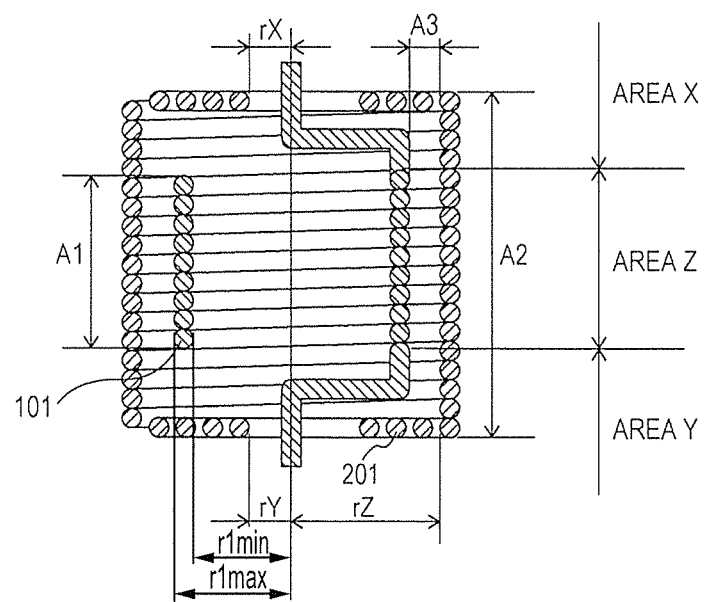
Figure 2D:
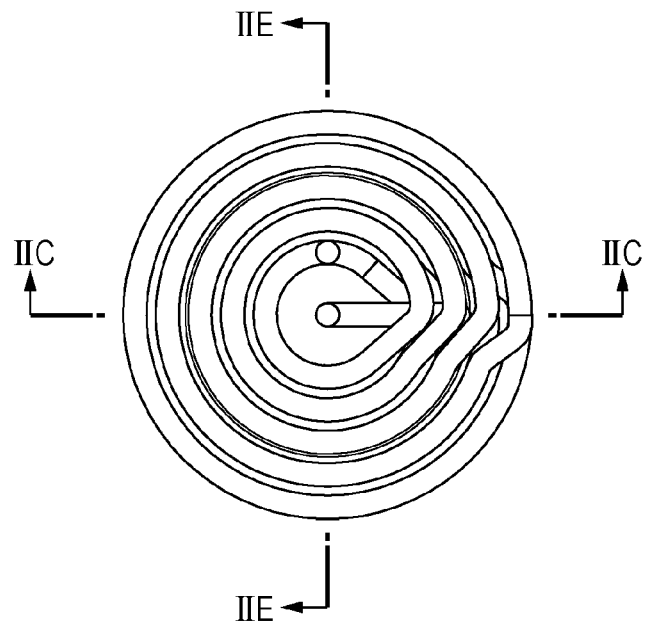
Figure 2E:
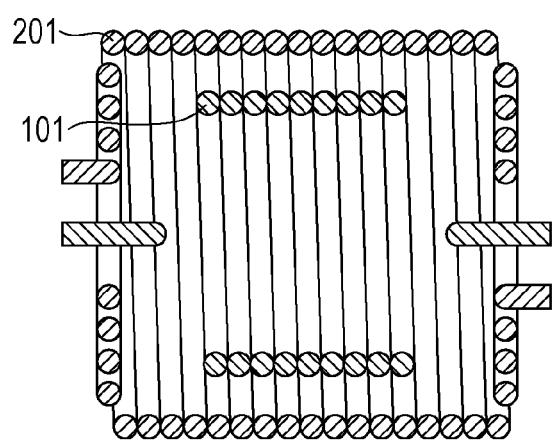

FIGS. 1A and 1B show an exemplary structure of a magnetic component according to a first embodiment.

FIG. 1A shows an exemplary structure of a first winding 101. FIG. 1B shows an exemplary structure of a second winding 201 disposed surrounding the first winding 101.

FIGS. 2A to 2E show an exemplary arrangement of the first winding 101 and the second winding 201 in the magnetic component in the first embodiment.

The magnetic component in the first embodiment includes the first winding and the second winding.

The second winding is disposed being insulated from the first winding. The second winding magnetically couples with the first winding.

The first winding forms a first coil unit by being wound about an axis.

The second winding forms a second coil unit by being wound about the same axis as the first winding.

An area, in the axial direction, in which the first coil unit is not disposed is represented as area X.

An area, in the axial direction, which is positioned opposite the area X across the first coil unit in the axial direction and in which the first coil unit is not disposed is represented as area Y.

An area, in the axial direction, in which the first coil unit is disposed is represented as area Z.

Then, in the magnetic component according to the first embodiment, the second winding forming the second coil unit is disposed in areas X, Y, and Z.

The distance between the innermost periphery of the first coil unit and the axis is represented as r1min.

The distance between the outermost periphery of the first coil unit and the axis is represented as r1max.

The distance between the innermost periphery of the second coil unit and the axis in area X is represented as rX.

The distance between the innermost periphery of the second coil unit and the axis in area Y is represented as rY.

The distance between the innermost periphery of the second coil unit and the axis in area Z is represented as rZ.

Then, the magnetic component in the first embodiment has the first coil unit and the second coil unit at positons that satisfy the following Equations 1, 2, and 3.

$$r1\text{min} > rX \quad (1)$$

$$r1\text{min} > rY \quad (2)$$

$$r1\text{max} < rZ \quad (3)$$

With this structure, diffusion of magnetic fluxes outside the second winding can be reduced. That is, flux leakage around the magnetic component is decreased, so that electromagnetic noise can be reduced. Further, decrease in magnetic flux diffusion enables more efficient isolated power transfer.

As illustrated in FIGS. 2A to 2E, in the magnetic component according to the first embodiment, the second winding forming the second coil unit may be wound with a plurality of turns in area Z.

Also as illustrated in FIGS. 2A to 2E, in the magnetic component according to the first embodiment, the second winding forming the second coil unit may be wound with a plurality of turns in areas X and Y with varying radii of winding about the axis.

According to the above-described structure, the second winding, which surrounds the first winding, can be laid at increased density. This can further decrease the diffusion of magnetic fluxes outside the second winding.

In the exemplary structure illustrated in FIGS. 2A to 2E, the first winding 101 is formed as a finite-length solenoid having a length of A1 in the axial direction.

In the exemplary structure illustrated in FIGS. 2A to 2E, the maximum value of the winding radius of the first winding 101 is represented as r1max and the minimum value is represented as r1min. In the exemplary structure of FIGS. 2A to 2E, however, the first winding 101 is wound in a single layer in the radial direction. Accordingly, the maximum value and the minimum value of the winding radius of the first winding 101 are equal, Here, the length of the second winding 201 in the axial direction is represented as A2, the maximum value of the winding radius of the second winding 201 is represented as r2max, and the minimum value of the winding radius of the second winding 201 is represented as r2min.

Then, in the exemplary structure shown in FIGS. 2A to 2E, the second winding 201 is disposed so as to cover the first winding 101 while satisfying the following Equations 4, 5, and 6.

$$r1\text{min} > r2\text{min} \quad (4)$$

$$r1\text{max} < r2\text{max} \quad (5)$$

$$A1 < A2 \quad (6)$$

In the exemplary structure shown in FIGS. 2A to 2E, r2max is equal to rZ. Likewise, in the exemplary structure shown in FIGS. 2A to 2E, r2min is equal to rX.

The first winding 101 and the second winding 201 are positioned so that a desired insulation distance A3 is maintained between them.

In the first embodiment, the magnetic component may be a transformer.

The first winding 101 may be wound in multiple layers in the radial direction.

The second winding 201 may also be wound in multiple layers in the radial direction in area Z.

The second winding 201 may also be wound in multiple layers in the axial direction in either area X or area Y.

The first winding 101 and the second winding 201 may also be immersed in non-magnetic potting curing resin for heat dissipation, thus producing the magnetic component.

FIGS. 3A to 3D are schematic diagrams for describing the magnetic flux distribution in the magnetic component according to the first embodiment.

Figure 3A:
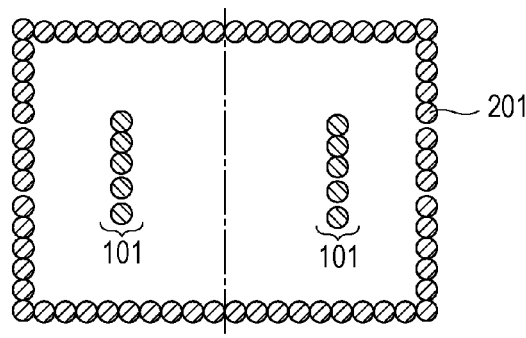
FIGS. 3A to 3D are schematic diagrams for describing the magnetic flux distribution in the magnetic component according to the first embodiment.

FIG. 3A shows a sectional structure of the first winding 101 and the second winding 201 on the assumption that they are wound only in the circumferential direction.

Figure 3B:
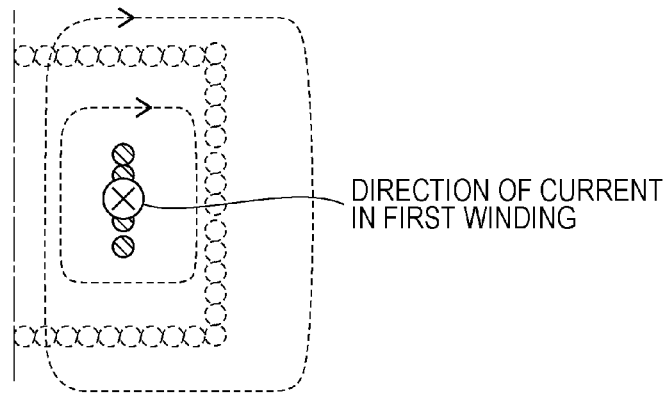

FIG. 3B schematically illustrates how the magnetic flux is distributed (the flow of the magnetic flux) in a case where current flows only in the first winding 101.

Figure 3C:
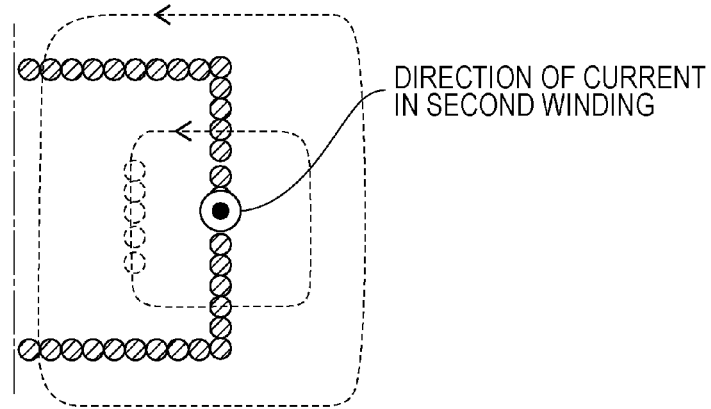

FIG. 3C schematically illustrates how the magnetic flux is distributed (the flow of the magnetic flux) in a case where current flows only in the second winding 201.

Figure 3D:
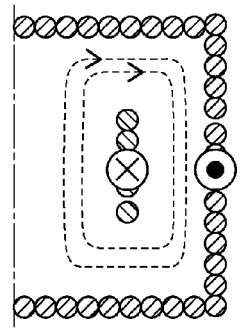

FIG. 3D schematically illustrates how the magnetic flux is distributed (the flow of the magnetic flux) in a case where currents of opposite phases flow in the first winding 101 and the second winding 201.

As shown in FIG. 3D, inductive coupling is achieved due to interaction between the magnetic fluxes generated by the first winding 101 and the second winding 201.

Also as shown in FIG. 3D, when currents of opposite phases flow in the two windings, diffusion of the magnetic flux outside the second winding 201 is decreased.

Figure 4:
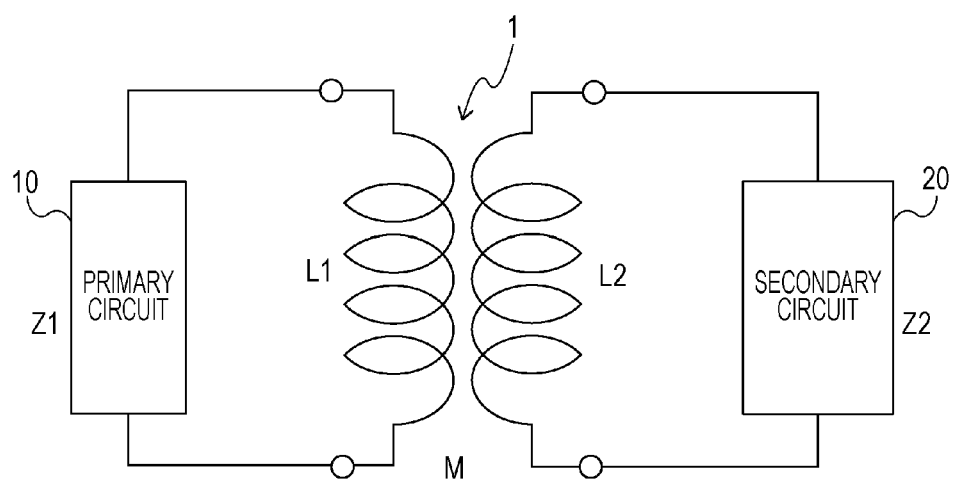
FIG. 4 is a circuit diagram for describing the circuit operation of a circuit including the magnetic component according to the first embodiment.

FIG. 4 is a circuit diagram for describing the circuit operation of a circuit including the magnetic component according to the first embodiment.

FIG. 4 shows a typical configuration example that includes a primary circuit 10 and a secondary circuit 20.

L1 represents the self-inductance of the first winding 101.

L2 represents the self-inductance of the second winding 201.

M represents the mutual inductance between the first winding 101 and the second winding 201.

Z1 represents the impedance of the primary circuit.

Z2 represents the impedance of the secondary circuit.

L1, L2, and M may be determined based on the number of turns, structure, and/or arrangement of the windings in consideration of the impedance Z1 of the primary circuit and the impedance Z2 of the secondary circuit.

FIGS. 5A to 5D are diagrams illustrating an example of a simulation experiment on the operation of a circuit including the magnetic component described in the first embodiment.

Figure 5A:
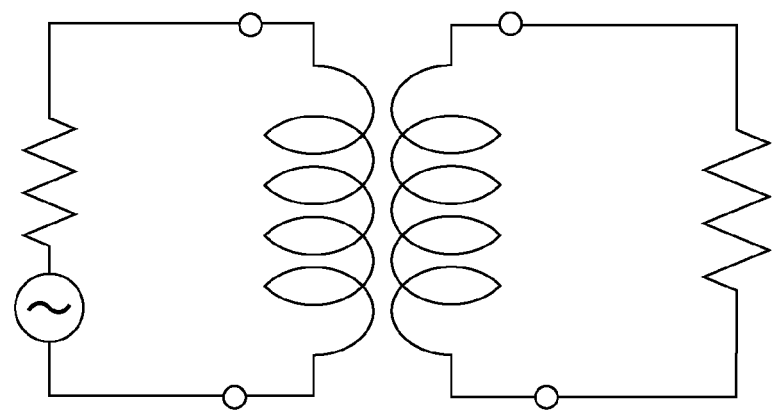
FIGS. 5A to 5D are diagrams illustrating an example of a simulation experiment on the operation of a circuit including the magnetic component described in the first embodiment.

FIG. 5A shows a circuit model for circuit simulation, where the frequency of alternating current driving is 1 kHz, the peak value of the power supply is 1 V, the internal resistance of the power supply is 1Ω, and the load resistance is 1Ω.

Figure 5B:
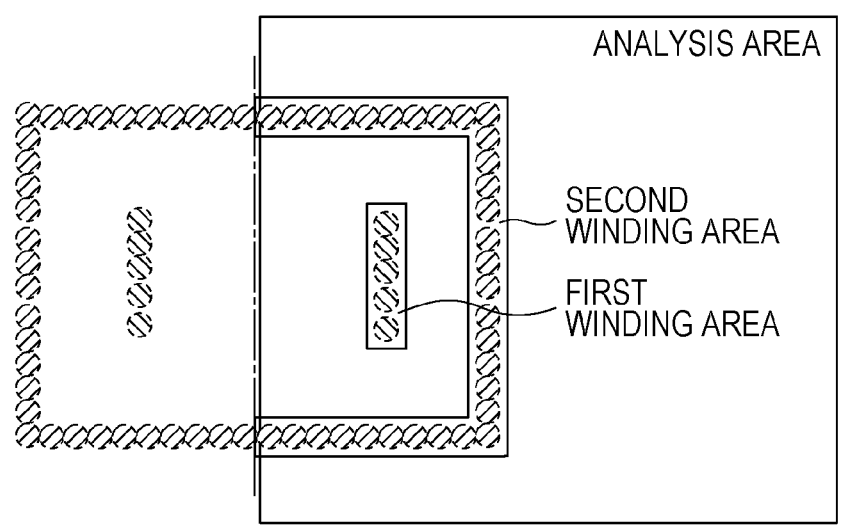

FIG. 5B shows a magnetic field analysis model for calculating the self-inductances L1, L2 and mutual inductance M of a transformer as the magnetic component. In FIG. 5B, the windings are depicted as being approximated to winding areas for simplifying the winding structure.

Figure 5C:
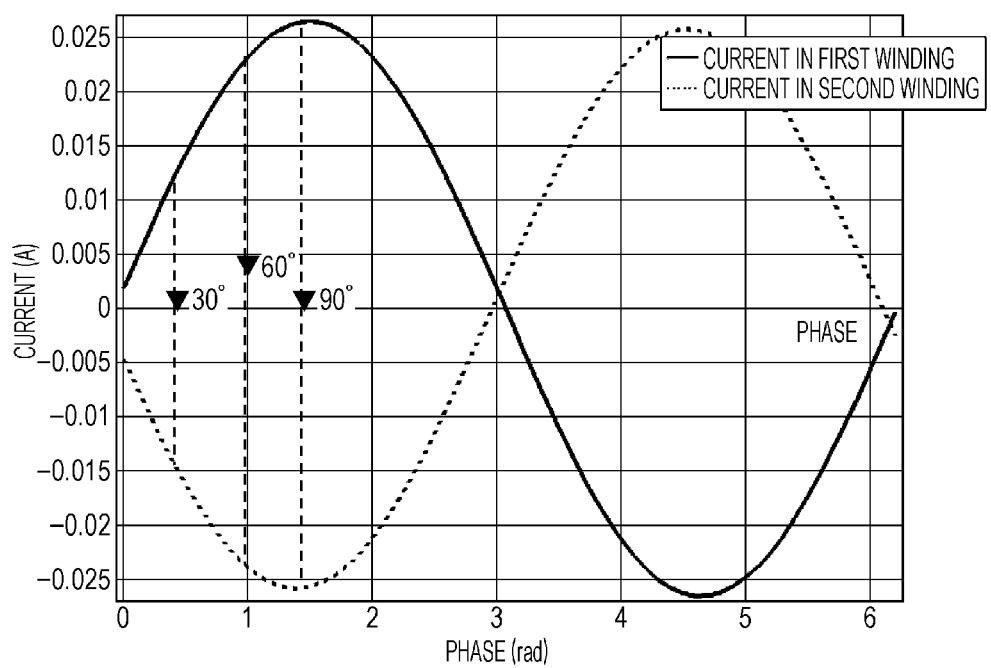

FIG. 5C shows results of waveform calculation for the currents flowing in the first winding 101 and the second winding 201. FIG. 5C represents an illustrative result of a calculation in which the circuit simulation shown in FIG. 5A is coupled with the magnetic field simulation shown in FIG. 5B.

Figure 5D:
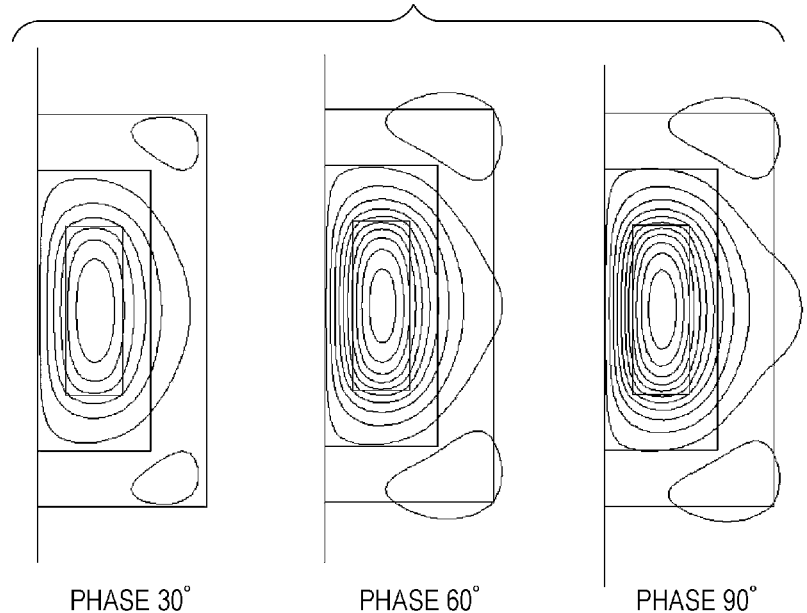
Figure 6A:
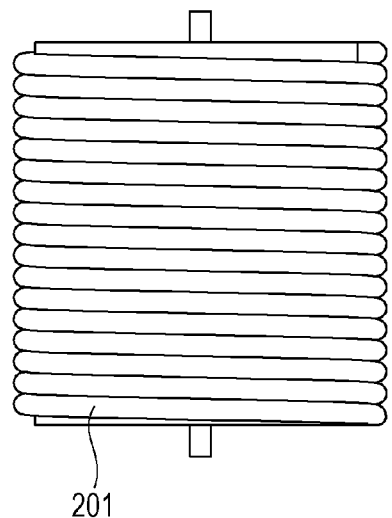
FIGS. 6A to 6E illustrate an exemplary structure of a magnetic component according to a second embodiment.
Figure 6B:
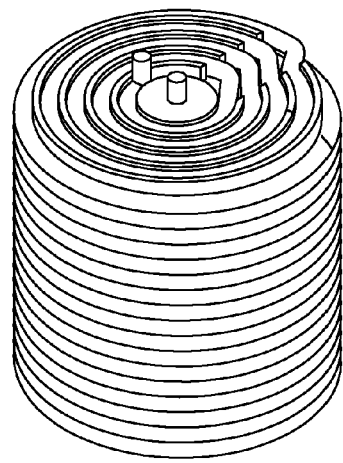
Figure 6C:
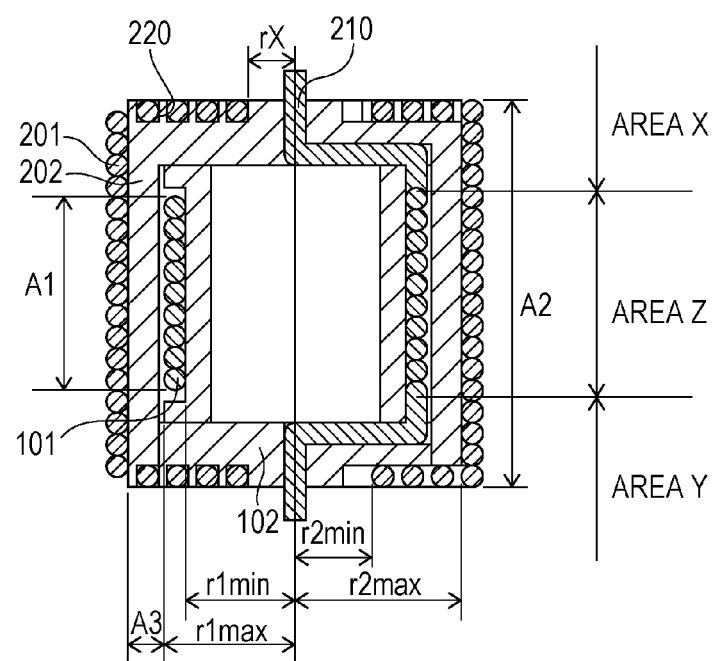
Figure 6D:
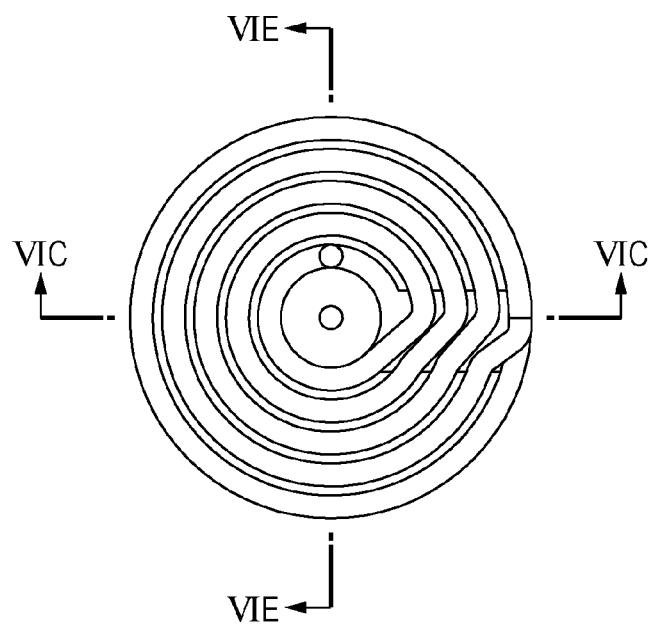
Figure 6E:
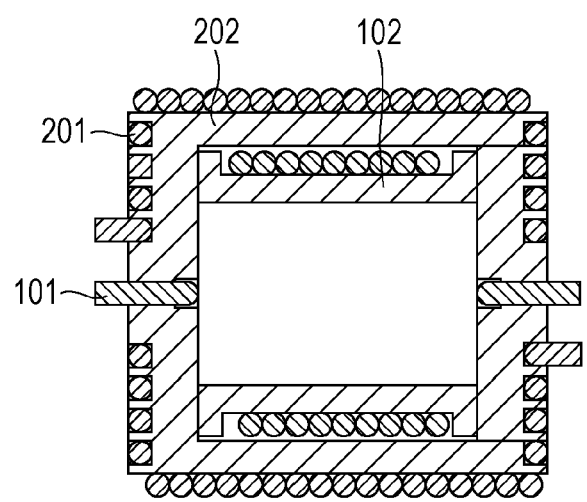

FIG. 5D shows results of calculation of the magnetic flux distribution for the time phases of 30°, 60°, and 90°.

The simulation result for the currents flowing in the first winding 101 and the second winding 201 reveals that high degree of coupling has been achieved.

The simulation result for the magnetic flux distribution indicates that little magnetic flux leaks outside the second winding 201.

SECOND EMBODIMENT

FIGS. 6A to 6E illustrate an exemplary structure of a magnetic component according to a second embodiment.

In FIGS. 6A to 6E, elements already used in FIGS. 1A, 1B, and 2A to 2E for describing the first embodiment are denoted with the same reference characters and description of such elements is omitted.

The magnetic component in the second embodiment includes a coil holding portion.

The coil holding portion maintains the positional relationship between the first coil unit and the second coil unit shown by the above Equations 1, 2, and 3.

With this structure, the positions of the first winding and the second winding can be maintained. Thus, the positional relationship between the first coil unit and the second coil unit can be retained even when disturbance such as vibration is applied. This can decrease the diffusion of magnetic fluxes outside the second winding even when disturbance such as vibration is applied.

In the second embodiment, the coil holding portion of the magnetic component may include a first coil holding portion and a second coil holding portion.

The first coil unit may be formed by the first winding being wound around the first coil holding portion.

The second coil holding portion may have a tubular portion with a cavity therein.

In such an implementation, the portion of the first coil holding portion in which the first coil unit is formed may be inserted into the cavity in the tubular portion of the second coil holding portion.

In such an implementation, the second coil unit may be formed by the second winding being wound around the outside of the tubular portion of the second coil holding portion.

With this structure, the positions of the first winding and the second winding in axial and radial directions can be maintained with increased accuracy. In addition, due to the structure enabling insertion of the first coil holding portion into the second coil holding portion, the magnetic component can be composed of a small number of parts. Additionally, due to the structure enabling insertion of the first coil holding portion into the second coil holding portion, the manufacturing process of the magnetic component can be simplified.

The second coil holding portion of the magnetic component in the second embodiment may also include a drawing hole.

In such an implementation, the lead of the first winding may be drawn outside the second coil holding portion through the drawing hole.

With this structure, the lead of the first winding can be easily drawn outside the coil holding portions.

In the second embodiment, the drawing hole of the second coil holding portion of the magnetic component may be positioned in area X.

In such an implementation, the distance from the axis to the drawing hole may be smaller than rX.

With such a structure, the lead of the first winding can be drawn from a portion in the vicinity of the winding axis in which the second winding is not present. Thus, the lead of the first winding can be drawn without affecting the position at which the second winding is disposed.

The second coil holding portion of the magnetic component in the second embodiment may also include a guide groove.

In such an implementation, the second winding forming the second coil unit may be wound along the guide groove in either area X or area Y.

With such a structure, the position of the second winding can be also maintained in area X or area Y. This can retain the positional relationship between the first coil unit and the second coil unit even when disturbance such as vibration is applied.

The magnetic component in the second embodiment may be a transformer, in which case the coil holding portion may be a bobbin.

The transformer shown in FIGS. 6A to 6E represents an example that uses a first winding bobbin 102 (the first coil holding portion) and a second winding bobbin 202 (the second coil holding portion) in order to form and maintain the structures of the first winding 101 and the second winding 201 shown in the first embodiment.

The first winding bobbin 102 and the second winding bobbin 202 may be fabricated from non-magnetic and insulating material.

Figure 7A:
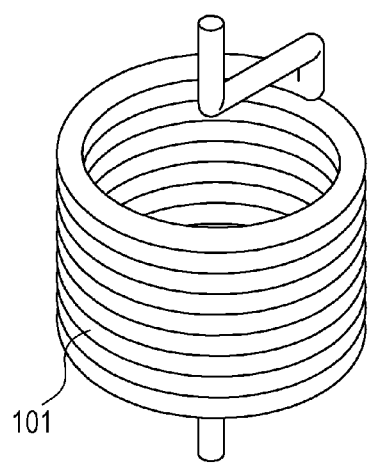
FIGS. 7A to 7C illustrate exemplary structures of the first winding and a first winding bobbin (a first coil holding portion)
Figure 7B:
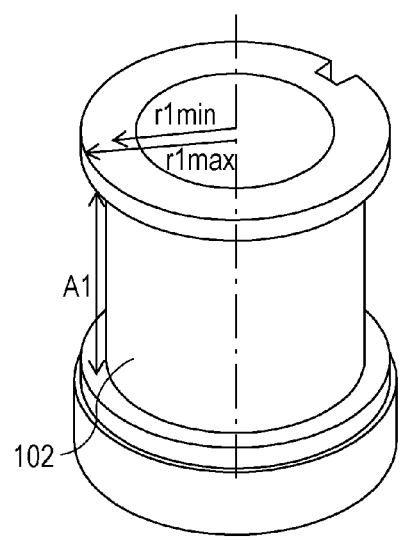
Figure 7C:
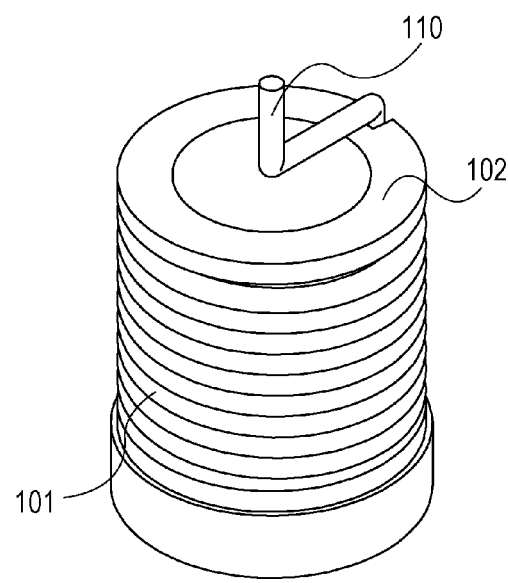

FIGS. 7A to 7C illustrate exemplary structures of the first winding 101 and the first winding bobbin 102 (the first coil holding portion).

FIG. 7C shows a structure in which the first winding 101 shown in FIG. 7A and the first winding bobbin 102 shown in FIG. 7B are put together.

From the first winding bobbin 102 shown in FIG. 7C, a lead 110 of the first winding 101 is drawn out.

The minimum radius r1min, maximum radius r1max, and axial length A1 of the first winding 101 may be determined by the first winding bobbin 102.

Figure 8A:
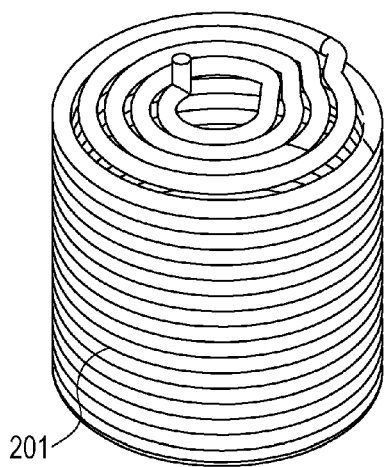
FIGS. 8A to 8C illustrate exemplary structures of the second winding and a second winding bobbin (a second coil holding portion)
Figure 8B:
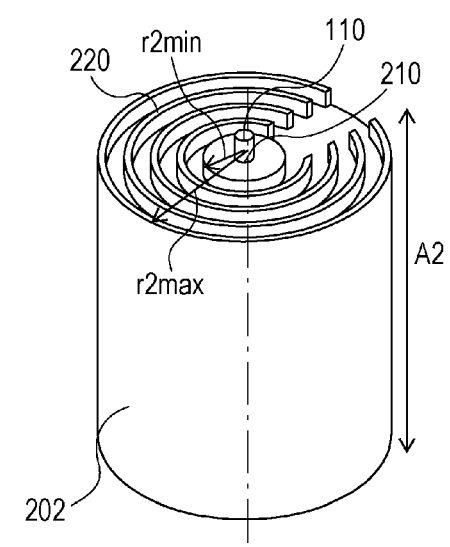
Figure 8C:
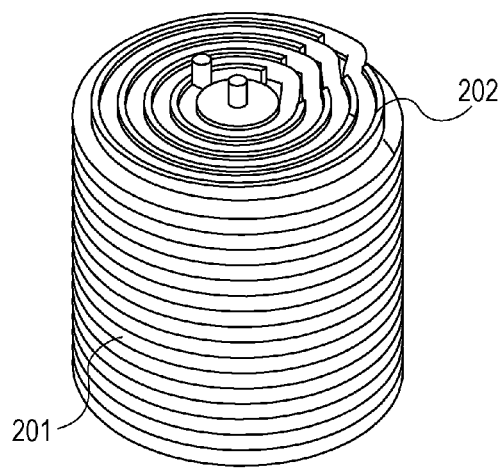

FIGS. 8A to 8C illustrate exemplary structures of the second winding 201 and the second winding bobbin 202 (the second coil holding portion).

FIG. 8C shows a structure in which the second winding 201 shown in FIG. 8A and the second winding bobbin 202 shown in FIG. 8B are put together.

The second winding bobbin 202 shown in FIGS. 8A to 8C has a drawing hole 210.

In the exemplary structure shown in FIGS. 8A to 8C, the lead 110 of the first winding 101 is drawn outside the second coil holding portion through the drawing hole 210.

Also in the exemplary structure shown in FIGS. 8A to 8C, the drawing hole 210 is positioned in area X, where the distance from the axis to the drawing hole 210 is smaller than r2min (=rX).

The second winding bobbin 202 (the second coil holding portion) shown in FIGS. 8A to 8C has a guide groove 220 in areas X and Y.

In the exemplary structure shown in FIGS. 8A to 8C, the second winding 201 forming the second coil unit is wound along the guide groove 220 in areas X and Y.

The minimum radius r2min, maximum radius r2max, and axial length A2 of the second winding 201 may be determined by the second winding bobbin 202. Further, distances rX and rY of the second winding 201 may be determined by the second winding bobbin 202.

The insulation distance A3 may also be determined by the radial thickness of the second winding bobbin 202.

THIRD EMBODIMENT

Figure 9:
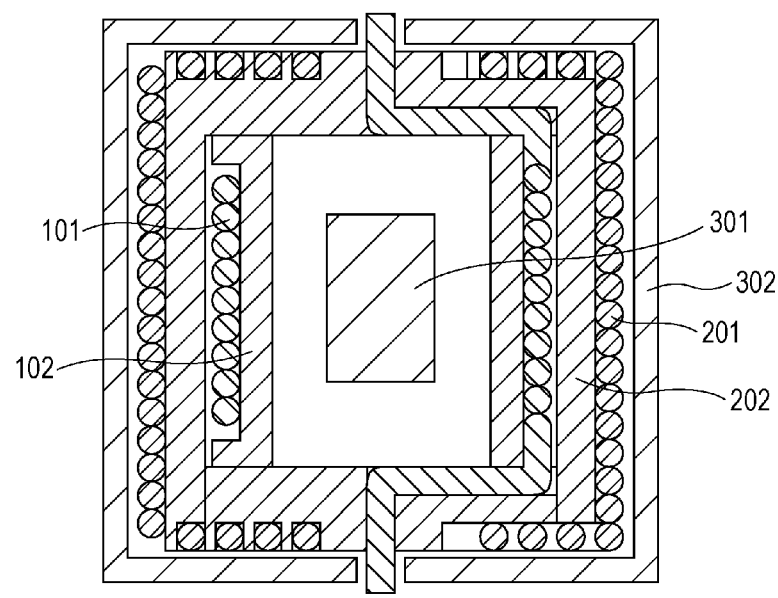
FIG. 9 schematically shows an exemplary structure of the magnetic component according to a third embodiment.

FIG. 9 schematically shows an exemplary structure of the magnetic component according to the third embodiment.

In FIG. 9, elements already used in FIGS. 1A, 1B, 2A to 2E, and 6A to 6E for describing the first and second embodiments are denoted with the same reference numerals and description of such elements is omitted.

The magnetic component in the third embodiment includes an inner magnetic member inside the first coil unit.

With this structure, the mutual inductance of the magnetic component can be varied by changing the shape, arrangement, and material of the inner magnetic member.

The magnetic component in the third embodiment also includes an outer magnetic member outside the second coil unit.

With this structure, the mutual inductance of the magnetic component can be varied by changing the shape, arrangement, and material of the outer magnetic member. In addition, the outer magnetic member can confine lines of magnetic flux that leak outside the second winding, which consequently can further decrease the diffusion of magnetic fluxes outside the second winding.

The magnetic component in the third embodiment may be a transformer.

The transformer in the third embodiment is provided with an inner magnetic member 301 either inside the first winding 101 or inside the first winding bobbin 102. The self-inductances L1, L2 of the first winding 101 and the second winding 201 thus can be designed by varying the shape, arrangement, and material of the inner magnetic member 301. This can broaden the design range of the mutual inductance of the transformer according to the third embodiment.

The transformer in the third embodiment is further provided with an outer magnetic member 302 either outside the second winding 201 or outside the second winding bobbin 202. This can confine lines of magnetic flux that leak outside the second winding 201. In addition, the self-inductances L1, L2 of the first winding 101 and the second winding 201 can be designed by varying the shape, arrangement, and material of the outer magnetic member 302. This can vary the magnetic flux distribution within the transformer, which in turn can broaden the design range of the mutual inductance of the transformer according to the third embodiment.

The magnetic component in the third embodiment may have only either one of the inner magnetic member or the outer magnetic member.

FOURTH EMBODIMENT

Figure 10:
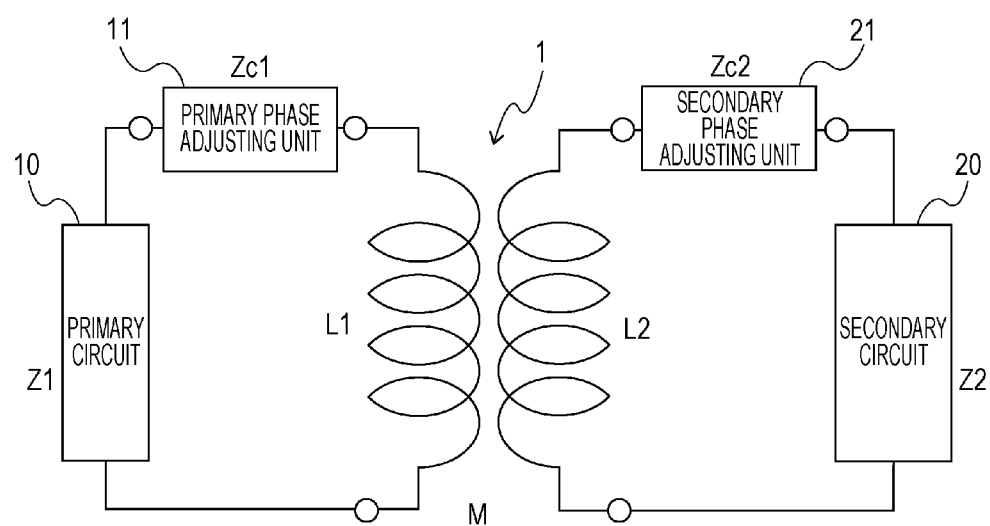
FIG. 10 is a circuit diagram showing an exemplary configuration of a power transfer device in a fourth embodiment.

FIG. 10 is a circuit diagram showing an exemplary configuration of a power transfer device according to the fourth embodiment.

In FIG. 10, elements already used in FIG. 4 for describing the first embodiment are denoted with the same reference characters and description of such elements is omitted.

The power transfer device in the fourth embodiment includes one of the magnetic components described in the first to third and fifth embodiments, a first circuit, and a first phase adjusting unit.

The first circuit is a circuit that is connected with the first winding.

The first phase adjusting unit is connected with the first winding and the first circuit.

Being thus configured, the power transfer device in the fourth embodiment adjusts the degree of coupling between the first winding and the second winding by adjusting the impedance by way of the first phase adjusting unit.

With this configuration, the degree of coupling between the two windings can be controlled to desired characteristics. This enables optimization of power efficiency in accordance with the operation status of the power transfer device.

The power transfer device in the fourth embodiment may further include a second circuit and a second phase adjusting unit.

The second circuit is a circuit that is connected with the second winding.

The second phase adjusting unit is connected with the second winding and the second circuit.

Being thus configured, the power transfer device in the fourth embodiment may adjust the degree of coupling between the first winding and the second winding by adjusting the impedance by way of the second phase adjusting unit.

With this configuration, the degree of coupling between the two windings can be controlled to desired characteristics with even higher accuracy. This enables optimization of power efficiency in accordance with the operation status of the power transfer device.

The magnetic component in the fourth embodiment may be a transformer.

The power transfer device in the fourth embodiment may also constitute a part of a power circuit.

The exemplary configuration shown in FIG. 10 represents a power circuit that includes a primary phase adjusting unit 11 (the first phase adjusting unit) and a secondary phase adjusting unit 21 (the second phase adjusting unit) respectively on the primary and secondary sides of the magnetic component (a transformer) described in any of the first to third and fifth embodiments.

If the impedance Z1 of the primary circuit 10 (the first circuit) or the impedance Z2 of the secondary circuit 20 (the second circuit) varies during operation of the power circuit, a change occurs in the currents flowing in the first winding 101 and the second winding 201 of the transformer, resulting in a change in the degree of coupling of the transformer.

Thus, if the impedance Z1 of the primary circuit 10 or the impedance Z2 of the secondary circuit 20 varies, the impedance Zc1 of the primary phase adjusting unit 11 and Zc2 of the secondary phase adjusting unit 21 are controlled. By doing so, the phases of the currents flowing in the first winding 101 and the second winding 201 of the transformer are controlled, thereby maintaining the desired degree of coupling of the transformer.

The primary phase adjusting unit and the secondary phase adjusting unit may be composed of variable resistors, variable inductance, variable capacitance, switching elements, and the like.

The power transfer device according to the fourth embodiment can control the degree of coupling of the transformer to desired characteristics. This enables optimization of power efficiency in accordance with the operation status of the power supply device.

During alternating current operation, the current flowing in the primary winding of the transformer causes an alternating current magnetic flux to occur from the primary winding. The alternating current magnetic flux interlinks with the secondary winding to generate induced electromotive force in the secondary winding. As a result, current flows in the secondary winding as well as the secondary circuit connected with the secondary winding.

In the structure according to this embodiment, the secondary winding is disposed so as to cover the line of magnetic flux that occurs from the primary winding. Such an arrangement can cause induced electromotive force to be generated in the secondary winding due to variations in the alternating current magnetic flux generated by the primary winding. Similarly, when an alternating current magnetic flux that occurs due to the current flowing in the secondary winding interlinks with the primary winding, variations in the alternating current magnetic flux generated by the secondary winding can cause induced electromotive force in the primary winding.

That is to say, the degree of coupling between the primary winding and the secondary winding can be enhanced without use of a magnetic core. This can enable an isolation transformer capable of propagating alternating-current power while DC-isolating between the primary winding and the secondary winding.

Thus, since a magnetic core is not used, the isolation transformer produces less loss by the loss generated in the magnetic core compared to a conventional isolation transformer that uses a magnetic core. The isolation transformer that does not employ a magnetic core can eliminate the influence of loss that would be generated in the magnetic core during alternating current operation of a DC-DC converter or the like.

As described above, the structure in this embodiment can also reduce heat generated in the transformer itself, so the number of components relating to heat dissipating members can be reduced.

Additionally, with the structure in this embodiment, an alternating current magnetic flux generated by the primary winding and the secondary winding can be confined between the windings. This reduces leakage flux around the magnetic component and consequently lessens the effect of electromagnetic noise. Thus, costs required for addressing electromagnetic noise can be deceased.

FOURTH EMBODIMENT

The fifth embodiment will be now described, Description on matters that are the same as the above-described first to fourth embodiments may be omitted.

Figure 11:
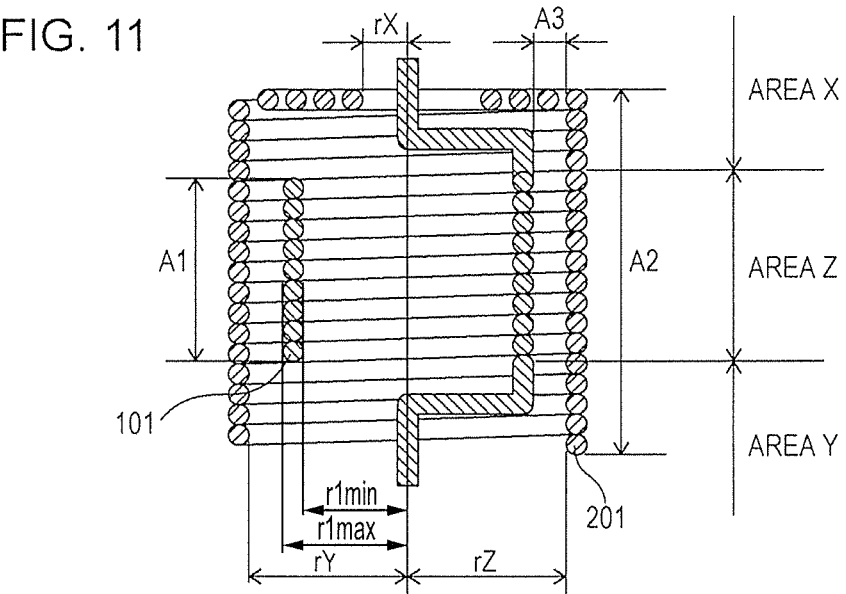
FIG. 11 shows an exemplary arrangement of the first winding and the second winding within the magnetic component according to a fifth embodiment.

FIG. 11 shows an exemplary arrangement of the first winding 101 and the second winding 201 within the magnetic component according to the fifth embodiment.

The magnetic component according to the fifth embodiment has the first coil unit and the second coil unit at positions that satisfy the following Equations 1, 3, and 7.

$$r1min > rX \quad (1)$$

$$r1max < rZ \quad (3)$$

$$r1min < rY \quad (7)$$

This structure allows the first coil unit to be inserted into and removed from the second coil unit on the side of area Y. The first coil unit and the second coil unit thus can be implemented as an outlet plug, for example. That is, an outlet plug with reduced diffusion of magnetic fluxes outside the magnetic component can be provided.

In a state in which the first coil unit is inserted in the second coil unit from the area Y side, non-contact power feed can be generated between the first coil unit and the second coil unit.

By pulling out the first coil unit from the second coil unit from the area Y side, the non-contact power feed between the first coil unit and the second coil unit can be stopped.

A traditional contact-type outlet plug requires contact between the terminals. Thus, sparks or the like could occur when the terminals make contact with each other.

In contrast, an outlet plug employing the magnetic component in the fifth embodiment of the present disclosure can realize non-contact power feed, thus eliminating the issue of sparks or the like described above.

Figure 12:
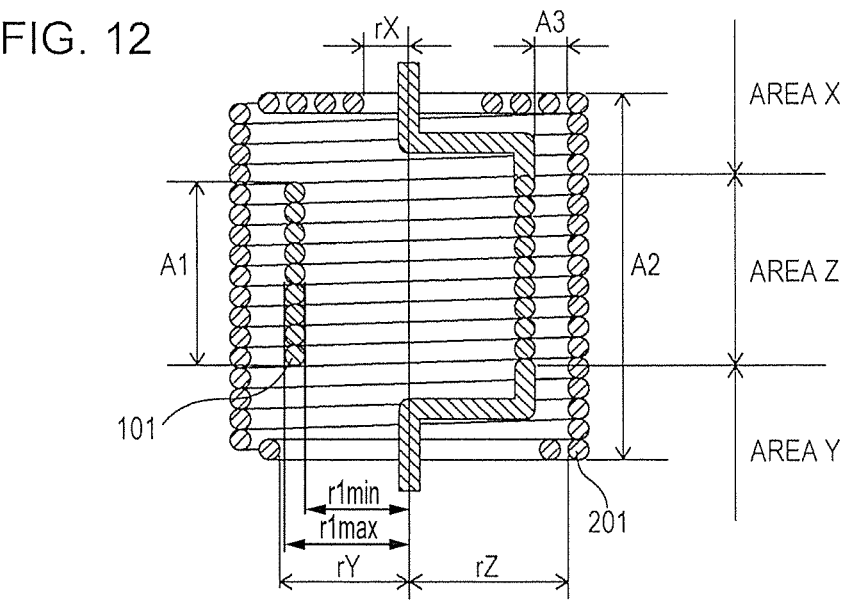
FIG. 12 shows a variation of the magnetic component according to the fifth embodiment.

FIG. 12 shows a variation of the magnetic component in the fifth embodiment.

As illustrated in FIG. 12, rY may be smaller than rZ in the magnetic component in the fifth embodiment.

Compared with the structure with rY=rZ such as shown in FIG. 11, the structure with rY<rZ such as shown in FIG. 12 can further reduce the diffusion of magnetic fluxes outside the second winding.

Figure 13:
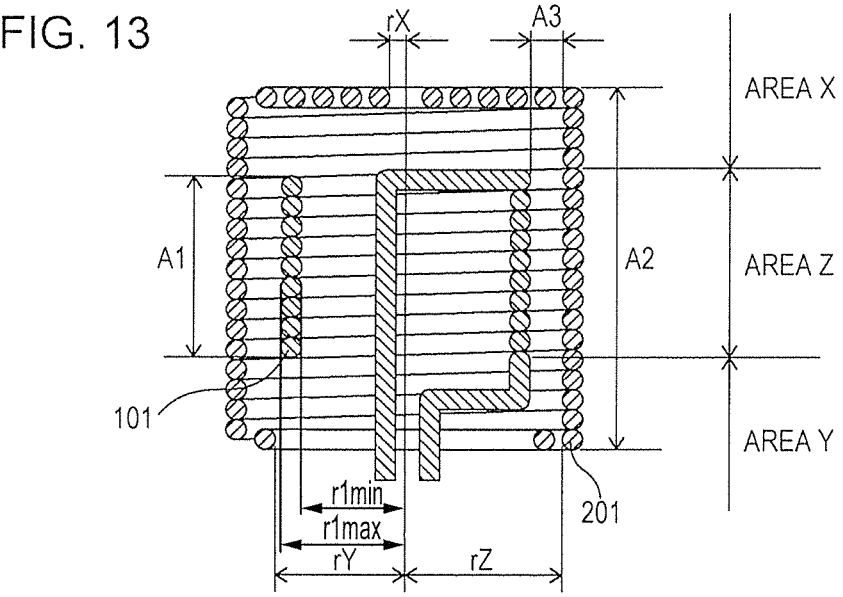
FIG. 13 shows another variation of the magnetic component according to the fifth embodiment.

FIG. 13 shows another variation of the magnetic component in the fifth embodiment.

As illustrated in FIG. 13, both ends of the first winding 101 may be drawn from the area Y side in the magnetic component in the fifth embodiment.

An outlet plug using the magnetic component illustrated in FIG. 13 could facilitate insertion and removal of the first coil unit into/from the second coil unit.

Additionally, in the structure shown in FIG. 13, rX may be made even smaller than in the structure described above in FIG. 11 or FIG. 12. This may further reduce the diffusion of magnetic fluxes outside the second winding.

Figure 14:
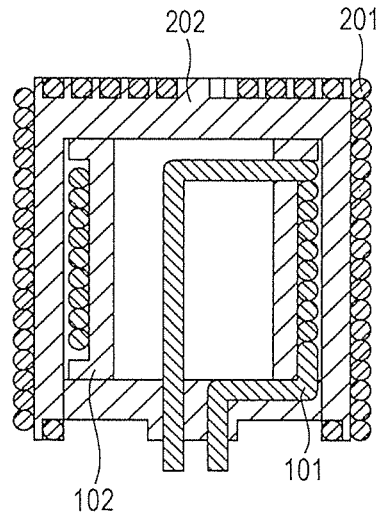
FIG. 14 is a sectional view showing an exemplary structure of winding bobbins for the magnetic component according to the fifth embodiment.

FIG. 14 is a sectional view showing an exemplary structure of winding bobbins for the magnetic component according to the fifth embodiment.

As illustrated in FIG. 14, the first winding bobbin 102 (the first coil holding portion) may be insertable into and removable from the second winding bobbin 202 (the second coil holding portion).

This structure can facilitate insertion and removal of the first coil unit into/from the second coil unit. Further, the positions of the first winding and the second winding in axial and radial directions can be retained with higher accuracy.

The structures and configurations described in the first to fifth embodiments may be combined with each other when desired.

The magnetic component according to the present disclosure can be employed in a power converter, for example.

While the present disclosure has been described with respect to exemplary embodiments thereof, it will be apparent to those skilled in the art that the disclosure may be modified in numerous ways and may assume many embodiments other than those specifically described above. Accordingly, it is intended by the appended claims to cover all modifications of the disclosure that fall within the true spirit and scope of the disclosure.

What is claimed is:

1. A magnetic component comprising:
   a first winding; and
   a second winding which is insulated from the first winding and magnetically couples with the first winding, wherein
   the first winding forms a first coil unit by being wound,
   the second winding forms a second coil unit by being wound about a same axis as the first winding, the second winding forming the second coil unit is disposed in an area X and an area Z, where the area X is an area, in an axial direction, in which the first coil unit is not disposed, and the area Z is an area, in the axial direction, in which the first coil unit is disposed, and the first coil unit and the second coil unit are disposed at positons that satisfy following Equations 1 and 3:

$$r1min > rX \quad (1),$$

and $$r1max < rZ \quad (3),$$

where r1min is a distance between an innermost periphery of the first coil unit and the axis, r1max is a distance between an outermost periphery of the first coil unit and the axis, rX is a distance between the innermost periphery of the second coil unit and the axis in the area X, and rZ is a distance between the innermost periphery of the second coil unit and the axis in the area Z.

2. The magnetic component according to claim 1, wherein the second winding forming the second coil unit is disposed in an area Y, where the area Y is an area, in the axial direction, which is positioned opposite the area X across the first coil unit in the axial direction and in which the first coil unit is not disposed, the first coil unit and the second coil unit are disposed at positons that satisfy the following Equation 2:

$$r1min > rY \quad (2),$$

where rY is a distance between the innermost periphery of the second coil unit and the axis in the area Y.

3. The magnetic component according to claim 1, wherein the second winding forming the second coil unit is disposed in an area Y, where the area Y is an area, in the axial direction, which is positioned opposite the area X across the first coil unit in the axial direction and in which the first coil unit is not disposed, the first coil unit and the second coil unit are disposed at positons that satisfy the following Equation 7:

$$r1min < rY \quad (7),$$

where rY is a distance between the innermost periphery of the second coil unit and the axis in the area Y.

4. The magnetic component according to claim 1, wherein the second winding forming the second coil unit is wound with a plurality of turns in the area Z, and the second winding forming the second coil unit is wound with a plurality of turns in the area X with varying radii of winding about the axis.

5. The magnetic component according to claim 1, further comprising:

a coil holding portion, wherein the coil holding portion maintains a positional relationship between the first coil unit and the second coil unit shown by the Equations 1 and 3.

6. The magnetic component according to claim 5, wherein the coil holding portion includes a first coil holding portion and a second coil holding portion, the first coil unit is formed by the first winding being wound around the first coil holding portion, the second coil holding portion has a tubular portion with a cavity therein, a portion of the first coil holding portion in which the first coil unit is formed is inserted into the cavity in the tubular portion of the second coil holding portion, and the second coil unit is formed by the second winding being wound around an outside of the tubular portion of the second coil holding portion.

7. The magnetic component according to claim 6, wherein the second coil holding portion includes a drawing hole, and a lead of the first winding is drawn outside the second coil holding portion through the drawing hole.

8. The magnetic component according to claim 7, wherein the drawing hole is positioned in the area X, and the distance from the axis to the drawing hole is smaller than the rX.

9. The magnetic component according to claim 6, wherein the second coil holding portion includes a guide groove, and the second winding forming the second coil unit is wound along the guide groove in the area X.

10. The magnetic component according to claim 1, further comprising:

an inner magnetic member inside the first coil unit.

11. The magnetic component according to claim 1, further comprising:

an outer magnetic member outside the second coil unit.

12. A power transfer device comprising:

the magnetic component according to claim 1;

a first circuit connected with the first winding; and a first phase adjusting unit connected with the first winding and the first circuit, wherein a degree of coupling between the first winding and the second winding is adjusted by adjusting impedance by way of the first phase adjusting unit.

13. The power transfer device according to claim 12, further comprising:

a second circuit connected with the second winding; and a second phase adjusting unit connected with the second winding and the second circuit, wherein the degree of coupling between the first winding and the second winding is adjusted by adjusting impedance by way of the second phase adjusting unit.

* * * * *